J. DANGEL.
GRAIN BINDER.
APPLICATION FILED AUG. 8, 1910.
991,834.
Patented May 9, 1911.
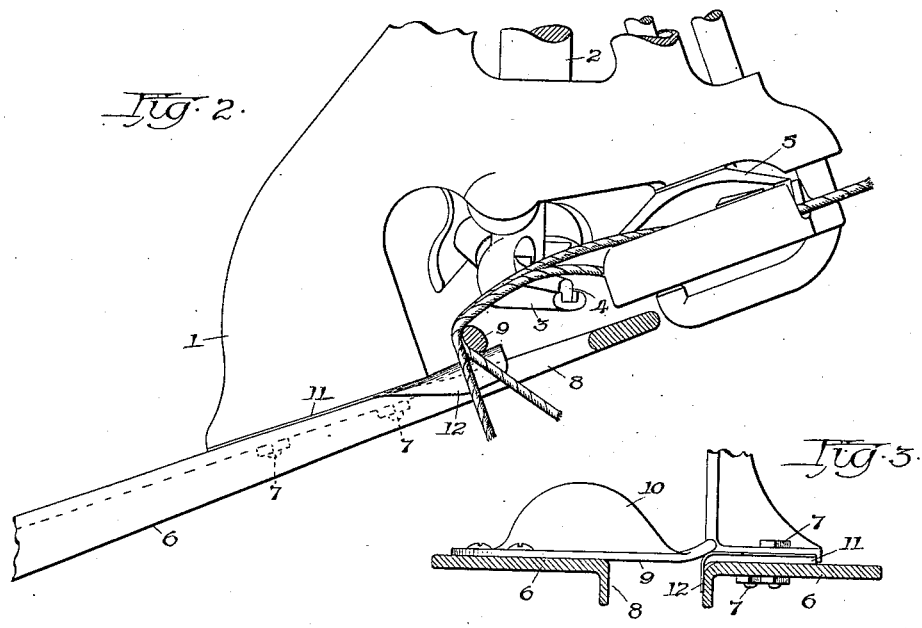
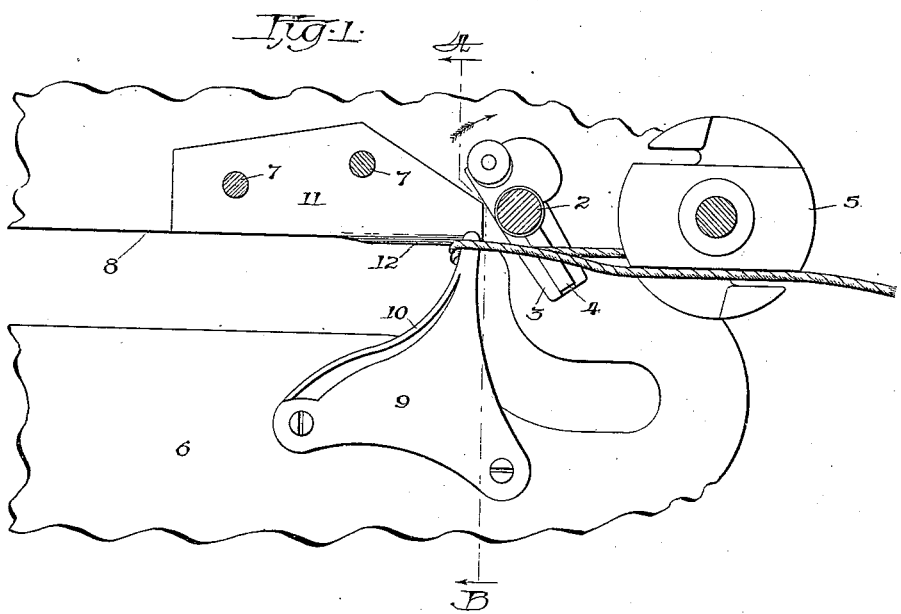
Witnesses:
F. W. Hoffmeister
Inventor.
John Dangel
By E. W. Burgess
Attorney.

UNITED STATES PATENT OFFICE.

JOHN DANGEL, OF CHICAGO, ILLINOIS, ASSIGNOR TO INTERNATIONAL HARVESTER COMPANY, A CORPORATION OF NEW JERSEY.

GRAIN-BINDER.

991,834.  Specification of Letters Patent.  Patented May 9, 1911.

Application filed August 8, 1910. Serial No. 576,086.

*To all whom it may concern:*

Be it known that I, JOHN DANGEL, a citizen of the United States, residing at Chicago, in the county of Cook and State of Illinois, have invented certain new and useful Improvements in Grain-Binders, of which the following is a specification.

My invention relates to grain binders, and in particular to mechanism for guiding and retaining the twine in proper position to be received by the knotter hook as it begins its rotative movement in its operation of tying the knot in the two strands of twine; the object of my invention being to provide means that will be effective in guiding the twine toward the knotter hook and temporarily retaining it in proper position by means that will yieldingly resist a rotative action of the knotter hook in releasing the twine from the guiding mechanism. I attain this object by means of the mechanism illustrated in the accompanying drawing, in which—

Figure 1 represents a top plan view of part of a grain binder knotter mechanism sufficient to illustrate the application of my invention; Fig. 2 is a longitudinal sectional view of Fig. 1; Fig. 3 is a cross section of Fig. 1 along line A—B; and Fig. 4 is a detached detail of part of the twine guiding mechanism.

The same reference characters designate like parts throughout the several views.

1 represents a portion of the knotter frame, in which is journaled a vertically arranged shank 2, having a fixed hook 3 at its lower end forming the fixed jaw of the knotter, that coöperates with the movable jaw 4 in a common way to tie a knot in the two strands of twine, and 5 represents a common form of twine holder located in rear of the knotter hook.

6 represents a breastplate which is secured to the knotter frame by means of bolts 7, and having a longitudinal slot 8 through which the needle passes in delivering the twine to the knotter mechanism, and of irregular outline at its rear end for the purpose of facilitating the stripping of the twine from the knotter hook at the end of its tying movement.

9 represents a fixed twine guiding finger secured to the breastplate upon the side of the slot opposite the knotter hook, the finger projecting across the slot below the hook and in front of the axis thereof, and trending rearward as it approaches the hook. The finger is provided with a deflecting flange 10 operative to guide the twine downward and inward toward said hook, the inner end of the finger turned upward from and overlapping the breastplate upon the side of the slot adjacent the knotter hook.

11 represents a resilient plate secured to the breastplate, preferably by the same bolts that connect the knotter frame therewith, and provided with a depending lip portion 12 at its rear end upon the side adjacent the inner end of the finger 9 and normally contacting with the lower surface thereof, the rear end of the plate having an upward bend and the breastplate a depressed upper surface in rear of the base of the knotter frame, permitting a yielding movement of the rear end of the plate downward and away from the finger as the twine is drawn against it by the operative movement of the knotter hook.

What I claim as my invention, and desire to secure by Letters Patent, is:

1. A cord knotter including, in combination, a knotter hook, a breastplate provided with a cord guiding slot, a cord guiding finger projecting laterally from one side of said slot toward said knotter hook located upon the opposite side of said slot and along and over the end of which the knotter hook carries the cord as it turns, and a plate secured to said breastplate upon the opposite side of the slot, the upper side of said plate normally contacting with the lower side of the adjacent end of said finger and coöperating therewith in a manner to yieldingly retain the cord thereon.

2. A cord knotter including, in combination, a knotter hook, a breastplate provided with a cord guiding slot, a cord guiding finger projecting laterally from one side of said slot toward said knotter hook located upon the opposite side of said slot and along and over the end of which the knotter hook carries the cord as it turns, and a plate secured to said breatplate upon the opposite side of the slot, the upper side of said plate normally contacting with the lower side of the adjacent end of said finger and coöperating therewith in a manner to yieldingly retain the cord, the upper side of said plate having a depending lip along its edge adjacent said finger.

3. A cord knotter including, in combination, a knotter hook, a breastplate provided with a cord guiding slot, a cord guiding finger projecting laterally from one side of said slot toward said knotter hook located upon the opposite side of said slot and along and over the end of which the knotter hook carries the cord as it turns, and a plate secured to said breastplate upon the opposite side of the slot and having its rear end bent upward and normally contacting the lower side of the adjacent end of said finger and coöperating therewith in a manner to yieldingly retain the cord thereon, said plate having a depending lip along its edge adjacent said finger.

JOHN DANGEL.

Witnesses:
WILLIAM WEBBER,
RAY D. LEE.